(12) United States Patent
Xi

(10) Patent No.: US 8,289,055 B2
(45) Date of Patent: Oct. 16, 2012

(54) HOST COMPUTER

(75) Inventor: Chun-Fang Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 231 days.

(21) Appl. No.: 12/883,140

(22) Filed: Sep. 15, 2010

(65) Prior Publication Data

US 2012/0043993 A1    Feb. 23, 2012

(30) Foreign Application Priority Data

Aug. 19, 2010   (CN) .......................... 2010 1 0257415

(51) Int. Cl.
*H03K 5/22* (2006.01)

(52) U.S. Cl. .......................................... 327/77; 327/50

(58) Field of Classification Search .................. 327/50, 327/77, 80, 81, 97
See application file for complete search history.

(56) References Cited

U.S. PATENT DOCUMENTS

| 7,034,581 | B2 * | 4/2006 | Sudou ............................. 327/77 |
| 7,196,495 | B1 * | 3/2007 | Burcham ...................... 320/134 |
| 7,928,776 | B2 * | 4/2011 | Wang et al. .................. 327/143 |

* cited by examiner

*Primary Examiner* — Hai L Nguyen
(74) *Attorney, Agent, or Firm* — Altis Law Group, Inc.

(57) ABSTRACT

A host computer includes an enclosure, a motherboard mounted in the enclosure. The motherboard includes a battery, a reference voltage generating circuit, an electronic switch, an alarm unit mounted on the enclosure, and a comparator. The reference voltage generating circuit generates a reference voltage. The comparator is connected to the battery and the reference voltage generating circuit to receive the reference voltage and detect a voltage of the battery. The comparator compares the detected voltage of the battery with the reference voltage, and outputs a control signal to turn on the electronic switch to start the alarm unit when the voltage of the battery is less than the reference voltage.

6 Claims, 2 Drawing Sheets

HOST COMPUTER

BACKGROUND

1. Technical Field

The present disclosure relates to a host computer.

2. Description of Related Art

The coin shaped complementary metal oxide semiconductor (CMOS) battery on a motherboard supply power to such components as the CMOS memory, to retain the contents of the memory even when the electronic device is powered off. However, if the voltage of the CMOS battery becomes too low, some of the data in the CMOS memory may be lost. Therefore, it is important to monitor the voltage of the CMOS battery. Generally, a user can check the voltage by removing the battery when the power is on. However that is not convenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
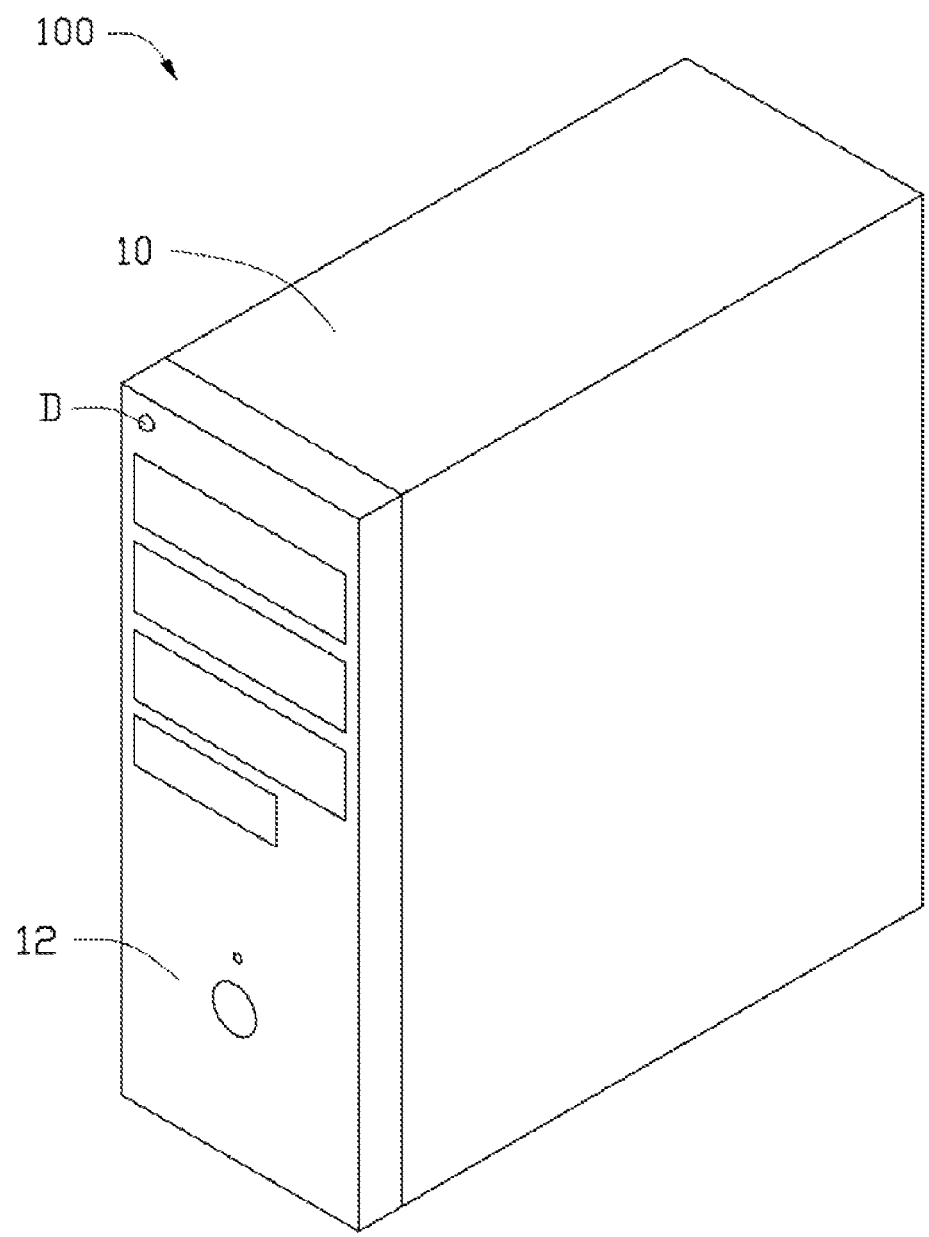
FIG. 1 is a schematic view of a host computer in accordance with an exemplary embodiment of the present disclosure; the host computer includes a voltage detection circuit.
Figure 2:
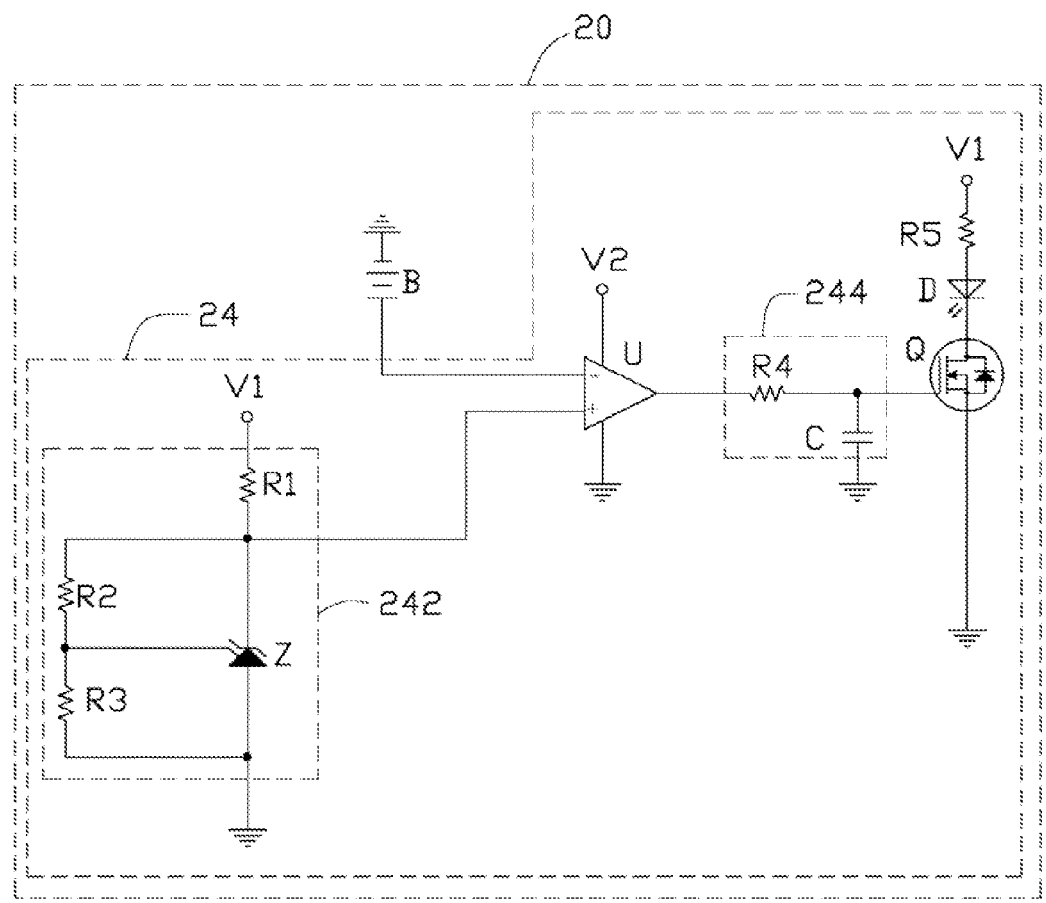
FIG. 2 is a circuit schematic diagram of the voltage detection circuit of FIG. 1.

Referring to FIGS. 1 and 2, an exemplary embodiment of a host computer 100 includes an enclosure 10 and a motherboard 20 mounted in the enclosure 10. The motherboard 20 includes a battery B and a voltage detection circuit 24 connected to the battery B to detect a voltage state of the battery B.

The voltage detection circuit 24 includes a comparator U, an electronic switch Q, an alarm unit mounted on a front panel 12 of the enclosure 10, a reference voltage generating circuit 242, and a delay circuit 244. In the embodiment, the alarm unit is a light emitting diode (LED) D.

The reference voltage generating circuit 242 includes a Zener diode Z and resistors R1-R3. The delay circuit 244 includes a resistor R4 and a capacitor C. An anode of the diode Z is grounded. A cathode of the diode Z is connected to a first power terminal V1 of the motherboard 20 by the resistor R1. The resistor R2 and the resistor R3 are connected in series between the anode of the diode Z and the cathode of the diode Z. A reference terminal of the diode Z is connected to a node between the resistors R2 and R3 to supply a first reference voltage. An inverting terminal of the comparator U is connected to a positive terminal of the battery B to detect the voltage of the battery B. A non-inverting terminal of the comparator U is connected to the cathode of the diode Z to receive a second reference voltage. A voltage terminal of the comparator U is connected to a second power terminal V2 of the motherboard 20. A ground terminal of the comparator U is grounded. The resistor and the capacitor C are connected in series between an output terminal of the comparator U and ground. A first terminal of the electronic switch Q is connected to the cathode of the LED D. An anode of the LED D is connected to the first power terminal V1 by the resistor R5. A second terminal of the electronic switch Q is grounded. A control terminal of the electronic switch Q is connected to a node between the resistor R4 and the capacitor C. In the embodiment, the delay circuit 244 is used to supply a stable voltage to the control terminal of the electronic switch Q. The electronic switch Q is an n-channel field effect transistor (FET). The control terminal, the first terminal, and the second terminal of the electronic switch Q is a gate, a drain, and a source of the n-channel FET, respectively. In other embodiments, the delay circuit 244 can be omitted if voltage stabilization is not needed for a particular application. The LED D of the alarm unit can be replaced by another alarm element, such as a speaker capable of emitting an audible warning signal. The electronic switch Q can be another transistor, such as an npn transistor.

After the cathode of the diode Z is connected to the first power terminal V1 by the resistor R1, the diode Z is turned on, and the reference terminal of the diode Z outputs the first reference voltage to the node between the resistors R2 and R3. The second reference voltage at the node between the cathode of the diode Z and the resistor R1 can be obtained according to a dividing voltage relationship of the resistors R2 and R3. When the voltage of the battery B is greater than the second reference voltage, the comparator outputs a low level signal. The low level signal is delayed by the delay circuit 244, and then is output to the control terminal of the electronic switch Q. The electronic switch Q is turned off. The LED D does not light. When the voltage of the battery is less than the second reference voltage, the comparator U outputs a high level signal. The high level signal is delayed by the delay circuit 244, and then is output to the control terminal of the electronic switch Q. The electronic switch Q is turned on. The LED D lights to alert a user that the voltage of the battery is low.

In the embodiment, a value of the first reference voltage is 2.5 Volts, the second reference voltage can be set to be 2.8 Volts by selecting values of the resistors R2 and R3 to start the alarm unit when the voltage value of the battery B is less than 2.8 Volts.

In other embodiments, the first reference voltage can be changed with changing of mode of the diode Z. The second reference voltage can be adjusted by selecting different values of the resistors R2 and R3. The LED D can be mounted on other positions of the enclosure 10.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A host computer comprising:
   an enclosure; and
   a motherboard mounted in the enclosure, the motherboard comprising:
      a battery;
      a reference voltage generating circuit to generate a reference voltage;
      an electronic switch;
      an alarm unit mounted on the enclosure; and a comparator connected to the reference voltage generating circuit and the battery to receive the reference voltage and detect a voltage of the battery, wherein the comparator compares the detected voltage of the battery with the reference voltage, the comparator outputs a control signal to turn on the electronic switch to start the alarm unit upon a condition that the voltage of the battery is less than the reference voltage, wherein the reference voltage generating circuit comprises a Zener diode, and first to third resistors, a cathode of the diode is connected a power terminal of the motherboard by the first resistor, an anode of the diode is grounded, the second resistor and the third resistor are connected in series between the anode and the cathode of the diode, a reference terminal of the diode is connected to a node between the second and third resistors, a non-inverting terminal of the comparator is connected to the cathode of the diode, an inverting terminal of the comparator is connected to a positive terminal of the battery.

2. The host computer of claim 1, wherein a control terminal of the electronic switch is connected to an output terminal of the comparator, a first terminal of the electronic switch is connected to the power terminal of the motherboard by the alarm unit, a second terminal of the electronic switch is grounded.

3. The host computer of claim 2, wherein the electronic switch is a field effect transistor (FET), the control terminal, the first terminal, and the second terminal of the electronic switch are a gate, a drain, and a source of the FET.

4. The host computer of claim 2, wherein the alarm unit is a light emitting diode (LED), an anode of the LED is connected to the power terminal, a cathode of the LED is connected to the first terminal of the electronic switch.

5. The host computer of claim 1, wherein the motherboard further comprises a delay circuit, the delay circuit is connected between an output terminal of the comparator and the electronic switch to delay the control signal and then output the delayed control signal to the electronic switch.

6. The host computer of claim 5, wherein the delay circuit comprises a resistor and a capacitor, the resistor and the capacitor are connected in series between the output terminal of the comparator and ground, the electronic switch is connected to a node between the resistor and the capacitor to receive the delayed control signal.

* * * * *